US007121553B2

(12) United States Patent
Cornea et al.

(10) Patent No.: US 7,121,553 B2
(45) Date of Patent: Oct. 17, 2006

(54) BUSHING FOR A HYDRAULIC VALVE

(75) Inventors: Marius Cornea, Lohr/Main (DE);
Bernd Weigand, Lohr/Main (DE)

(73) Assignee: Hydraulik-Ring GmbH,
Marktheidenfeld (DE)

( * ) Notice: Subject to any disclaimer, the term of this patent is extended or adjusted under 35 U.S.C. 154(b) by 34 days.

(21) Appl. No.: 10/709,375

(22) Filed: Apr. 30, 2004

(65) Prior Publication Data
US 2004/0244852 A1 Dec. 9, 2004

(30) Foreign Application Priority Data
May 3, 2003 (DE) ................. 103 19 831

(51) Int. Cl.
*F16J 15/02* (2006.01)
(52) U.S. Cl. ...................... 277/500; 277/628
(58) Field of Classification Search ........... 277/510, 277/628, 502, 512, 350, 422
See application file for complete search history.

(56) References Cited

U.S. PATENT DOCUMENTS 3,047,299 A * 7/1962 Karsten ................. 277/422
4,579,349 A * 4/1986 Pipich et al. .............. 277/422
5,615,860 A * 4/1997 Brehm et al. ........... 251/129.07
6,726,215 B1 * 4/2004 Uesugi et al. ............ 277/431

* cited by examiner

Primary Examiner—Vishal Patel
(74) Attorney, Agent, or Firm—Gudrun E. Huckett

(57) ABSTRACT

A bushing for a hydraulic valve has a bushing wall having openings allowing passage of a hydraulic medium to and from an interior of the bushing. The openings have an opening wall that at least across a portion of a circumference of the opening wall is formed as a molded bevel. The molded bevel is positioned at an acute angle to a radial plane of the bushing wall. The bushing wall has outer annular channels and the openings open into the outer annular channels, respectively.

13 Claims, 2 Drawing Sheets

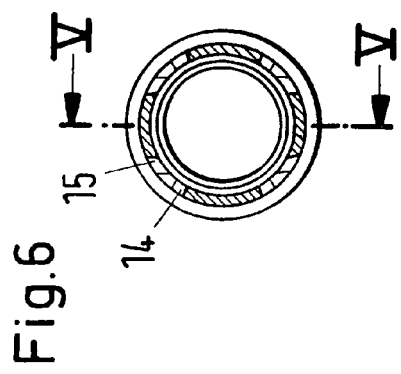
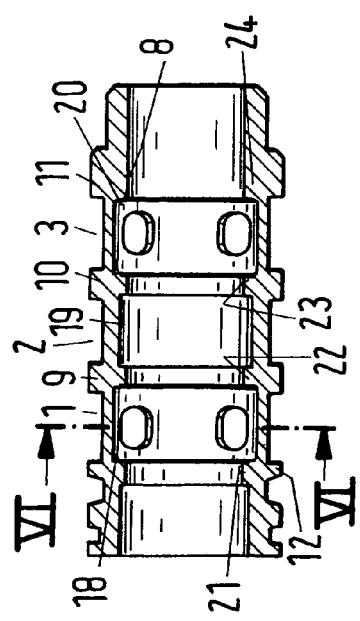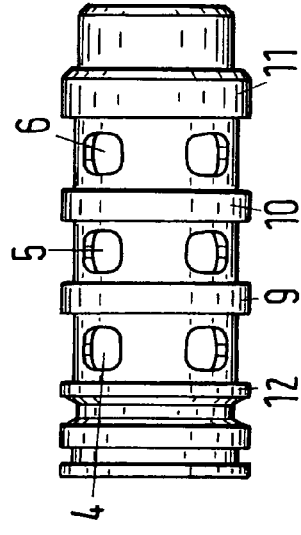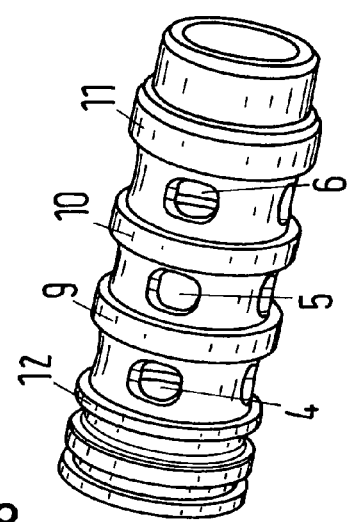

BUSHING FOR A HYDRAULIC VALVE

BACKGROUND OF INVENTION

1. Field of the Invention

The invention relates to a bushing for a hydraulic valve comprising openings in the bushing wall for allowing passage of hydraulic medium.

2. Description of the Related Art

Such bushings are used, for example, for cartridge valves in camshaft adjusting devices. Through the openings in the bushing the hydraulic medium is supplied to supply bores which are located in a cylinder head, an engine block, or a valve receiving block. The bushings are produced by turning from rod material of steel or light metal or are produced as cast light metal parts. The openings are mechanically produced or at least mechanically post-machined. Accordingly, the bushings are expensive with regard to their manufacture.

SUMMARY OF INVENTION

It is an object of the present invention to configure the bushing of the aforementioned kind such that it can be produced less expensively.

In accordance with the present invention, this is achieved in that the opening wall of the openings is formed at least across a portion of its periphery as a molded bevel.

In the bushing according to the invention the opening wall of the openings is formed at least across a portion of its periphery during molding as a molded bevel by a mold incline or mold draft. In this way, the openings can already be provided in the blank without requiring mechanical post-processing steps. For example, the bushing can be produced as a pressure diecast part or an injection molded part wherein additional mold slides are not required in an appropriate diecast mold or injection mold for producing the openings. The bushing according to the invention can therefore be produced very economically.

BRIEF DESCRIPTION OF DRAWINGS

FIG. 5 is a section view along the line V—V of FIG. 6 of a second embodiment of the bushing according to the invention for a hydraulic valve.

FIG. 6 is a section view taken along the line VI—VI in FIG. 5.

FIG. 7 shows the bushing according to FIG. 5 in an elevated side view.

FIG. 8 shows the bushing according to FIG. 5 in a perspective illustration.

DETAILED DESCRIPTION

Figure 2:
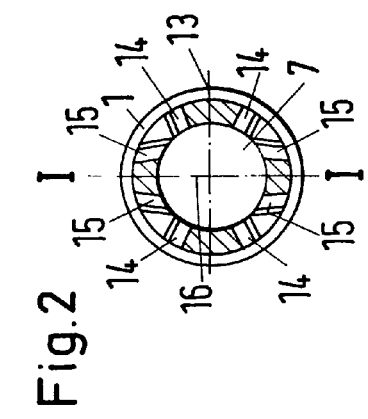
FIG. 2 is a section view taken along the line II—II of FIG. 1.
Figure 1:
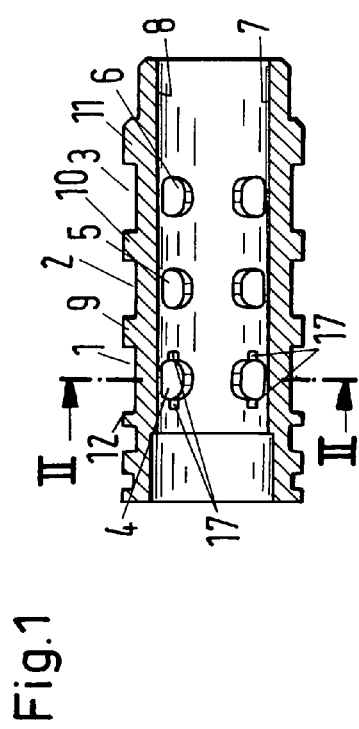
FIG. 1 is a section view of the bushing according to the invention for a hydraulic valve in a section taken along the line I—I of FIG. 2.
Figure 3:
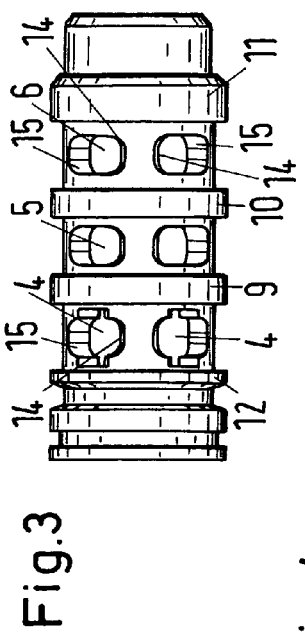
FIG. 3 is an elevated side view of the bushing according to FIG. 1.
Figure 4:
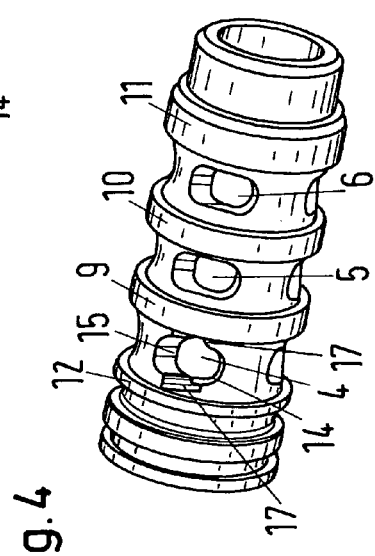
FIG. 4 shows the bushing in a perspective illustration.

The hydraulic part of cartridge valves of the type used in connection with camshaft adjusters in automotive technology are comprised in general of a bushing in which a piston is axially moved in order to distribute hydraulic oil flows to the appropriate connectors. The bushing according to FIGS. 1 through 4 is provided on the periphery of its bushing wall with outer annular channels 1 through 3 through which the pressure medium is guided to the supply bores that are provided within a receiving block such as a cylinder head, an engine block or a special valve receiving block. The outer annular channels 1 through 3 are provided about their circumference with openings 4 through 6, distributed uniformly or non-uniformly, that connect the annular channels 1 through 3 with the interior 7 of the bushing. The interior 7 is delimited by a cylindrical wall 8 that has almost across the entire length of the bushing wall a constant diameter. Only the end outside of the area of the outer annular channels 1 through 3, shown to the left in FIG. 1, has a slightly greater diameter for the interior wall 8 in comparison to the other areas of the interior wall of the bushing wall.

The outer annular channels 1 through 3 are separated from one another by annular webs 9 through 11. The outer annular channel 1 is axially delimited by an annular web 12 that delimits the outer annular channel 1 in the direction of the neighboring end of the bushing wall.

The bushing is a diecast part of light metal or an injection molded plastic part, and the openings 4 to 6 are already produced during the diecasting process or injection molding process. In this way, a subsequent mechanical machining is not required.

FIG. 2 shows in a dash-dotted line the parting line 13 between the diecast mold parts or the injection mold parts. The openings 4 through 6 are formed such that the mold does not require additional slides so that the bushing can be produced very economically. In order to achieve this, the openings 4 to 6 are formed such that the sidewalls are formed partially as molded bevels formed by appropriate mold drafts. As shown in FIG. 2, one portion 14 of the opening wall of the openings 4 to 6 is positioned approximately in a radial plane. The opposed portion 15 of the opening wall of the openings 4 to 6 is formed as a molded bevel that, in radial section according to FIG. 2, defines together with the radial plane 16 of the bushing an acute angle that opens in the direction of the interior 7 of the bushing (FIG. 2). The openings 4 through 6 thus taper from the outer side of the bushing wall radially inwardly toward the interior 7.

The openings 4 in the outer annular channel 1 are provided with oppositely positioned fine control openings 17 that have a significantly smaller cross-section than the openings 4 and are formed by recesses in the opening wall of the openings 4. When moving the piston, it is possible by means of these fine control openings 17, depending on the position of the piston, to allow passage of only a small amount of pressure medium. Only after an appropriate travel of the piston, the openings 4 are then opened or released more or less.

The fine control openings or grooves can also be provided in the other openings 5, 6. Also, it is possible to provide the fine control openings 17 only on a portion of the bore plane or opening plane.

The openings 4 are identical. The openings 5 and 6 of the outer annular channel 2, 3 are formed in the illustrated embodiment without fine control openings. The openings 5 and 6 are identical within the outer annular channel 2 or 3, respectively.

The bushing according to FIGS. 5 through 8 has in addition to the outer annular channels 1 to 3 also inner annular channels 18 through 20 that are provided on the inner wall 8 of the bushing. The inner annular channels 18 through 20 are positioned at the level of the outer annular channels 1 to 3, respectively, and are somewhat wider in the axial direction than the outer annular channels. The inner annular channels 18 through 20 are axially delimited in the axial direction by means of the annular webs 21 through 24. These webs 21–24 are narrower than the annular webs 9 through 12 on the outer side of the bushing wall. The annular webs 21 through 24 have the same inner diameter so that the piston (not illustrated) can be guided properly within the bushing wall.

The openings 4 through 6 are distributed uniformly or non-uniformly about the circumference of the bushing and connect the outer annular channels 1 through 3 with the inner annular channels 18 through 20. The openings 4 are provided in contrast to the preceding embodiment without fine control openings.

The openings 4 through 6 are in other respects identical to the preceding embodiment. The openings have the wall portion 14 that extends approximately radially and the wall portion 15 that is formed as molded bevel in accordance with the preceding embodiment. The openings in one plane can also be different, for example, can be formed as two narrow openings and two wide openings.

In the described embodiment, the openings 4 through 6 are provided directly on the blank so that subsequent mechanical processing steps are not required. The openings 4 through 6 are designed such that the bushing can be cast by means of a simple pressure diecast mold or injection mold without additional mold slides. The openings 4 through 6 form radial pressure medium connectors, for example, a pressure connector and working connectors having correlated therewith an outer annular channel 1 to 3 as a pressure medium distribution channel, respectively. In the embodiment according to FIGS. 5 through 8, the openings 4 through 6 can also be correlated with the inner annular channel 18 to 20. Instead of the annular channels functioning as distribution channels, the openings 4 through 6 can also be correlated with radial supply openings. In the embodiment according to FIGS. 1 through 4, the hydraulic characteristics line can be affected by the fine control openings 17.

While specific embodiments of the invention have been shown and described in detail to illustrate the inventive principles, it will be understood that the invention may be embodied otherwise without departing from such principles.

What is claimed is:

1. A bushing for a hydraulic valve, the bushing comprising:
   a bushing wall defining an interior of the bushing;
   the bushing wall having openings allowing passage of a hydraulic medium to and from the interior;
   wherein the openings have an opening wall that at least across a portion of a circumference of the opening wall is formed as a molded bevel;
   wherein several of the openings are arranged adjacent one another in a circumferential direction of the bushing;
   wherein the openings arranged adjacent one another in the circumferential direction, viewed in a cross-section of the bushing, have a first wall portion extending substantially radially and a second wall portion opposite the first wall portion, wherein the second wall portion is part of the molded bevel;
   wherein two of the openings neighboring one another in the circumferential direction are arranged such that the molded bevels are neighboring one another;
   wherein the molded bevels facing one another are positioned at an acute angle to a radial plane of the bushing wall, which radial plane is positioned centrally between the molded bevels neighboring one another;
   wherein the acute angle opens radially inwardly toward the interior.

2. The bushing according to claim 1, wherein the bushing wall has outer annular channels and wherein the openings open into the outer annular channels, respectively.

3. The bushing according to claim 2, wherein the interior of the bushing wall has an inner wall provided with inner annular channels.

4. The bushing according to claim 3, wherein the inner annular channels and the outer annular channels are connected with one another by the openings.

5. The bushing according to claim 4, wherein the outer annular channels and the inner annular channels are separated from one another by annular webs, respectively.

6. The bushing according to claim 5, wherein the annular webs separating the inner annular channels have identical inner diameter.

7. The bushing according to claim 1 formed as a diecast part.

8. The bushing according to claim 7 formed as a light metal diecast part.

9. The bushing according to claim 1 formed as an injection molded part.

10. The bushing according to claim 9, wherein the bushing is an injection molded plastic part.

11. The bushing according to claim 1, wherein at least some of the openings are provided with at least one fine control opening.

12. The bushing according to claim 1, wherein the at least one fine control opening is formed by a recess in the opening wall.

13. The bushing according to claim 1, wherein the interior of the bushing wall has a constant inner diameter.

* * * * *